US007589158B2

(12) United States Patent
Yang et al.

(10) Patent No.: US 7,589,158 B2
(45) Date of Patent: Sep. 15, 2009

(54) POLYMERS WITH IMPROVED SHELF STABILITY

(75) Inventors: Yong Yang, Piscataway, NJ (US); Navin Tilara, Roseland, NJ (US); Robert J. Sheerin, North Caldwell, NJ (US); Dan Sayre, Dover, NJ (US)

(73) Assignee: Columbia Insurance Company, Omaha, NE (US)

( * ) Notice: Subject to any disclaimer, the term of this patent is extended or adjusted under 35 U.S.C. 154(b) by 584 days.

(21) Appl. No.: 11/290,667

(22) Filed: Nov. 30, 2005

(65) Prior Publication Data

US 2007/0123638 A1   May 31, 2007

(51) Int. Cl.
*C08F 2/22* (2006.01)
(52) U.S. Cl. .................. 526/80; 526/87; 526/328.5; 524/556; 524/832; 523/406; 523/412
(58) Field of Classification Search ................... None
See application file for complete search history.

(56) References Cited

U.S. PATENT DOCUMENTS

| 2,795,564 | A |   | 6/1957  | Conn et al.            |
|-----------|---|---|---------|------------------------|
| 3,041,306 | A |   | 6/1962  | Baer                   |
| 3,324,066 | A |   | 6/1967  | Archangeli             |
| 3,404,114 | A |   | 10/1968 | Snyder                 |
| 3,450,796 | A |   | 6/1969  | Griffin                |
| 3,575,913 | A |   | 4/1971  | Meier                  |
| 3,784,498 | A |   | 1/1974  | Ceska                  |
| 4,151,143 | A |   | 4/1979  | Blank                  |
| 4,325,856 | A |   | 4/1982  | Ishikawa               |
| 4,544,697 | A |   | 10/1985 | Pickelman              |
| 4,569,964 | A |   | 2/1986  | Lee                    |
| 4,582,663 | A |   | 4/1986  | Pickelman              |
| 4,654,397 | A | * | 3/1987  | Mueller-Mall et al. ...... 524/460 |
| 4,880,842 | A |   | 11/1989 | Kowalski               |
| 4,970,241 | A |   | 11/1990 | Kowalski               |
| 5,021,469 | A | * | 6/1991  | Langerbeins et al. ........ 523/201 |
| 5,229,209 | A |   | 7/1993  | Gharapetian            |
| 5,236,991 | A |   | 8/1993  | Makati                 |
| 5,612,397 | A |   | 3/1997  | Gebhard                |
| 5,744,540 | A | * | 4/1998  | Baumstark et al. .......... 524/558 |
| 5,922,334 | A | * | 7/1999  | Krasnansky et al. ........ 424/401 |
| 5,962,571 | A |   | 10/1999 | Overbeek               |
| 5,990,228 | A |   | 11/1999 | Eichmann               |
| 6,001,922 | A |   | 12/1999 | Clark                  |
| 6,060,532 | A | * | 5/2000  | Frankel et al. ................. 522/46 |
| 6,646,086 | B2|   | 11/2003 | Slone                  |
| 6,723,779 | B2|   | 4/2004  | Drujon                 |
| 6,818,684 | B2|   | 11/2004 | Slone                  |
| 6,887,933 | B2|   | 5/2005  | Even                   |
| 7,138,455 | B2| * | 11/2006 | Miyake et al. .............. 524/556 |
| 2003/0088014 | A1 | * | 5/2003 | Edwards et al. ............. 524/523 |
| 2004/0198903 | A1 | * | 10/2004 | Madle et al. ................. 524/800 |
| 2005/0032933 | A1 | * | 2/2005 | Hermes et al. .............. 523/172 |

FOREIGN PATENT DOCUMENTS

EP   0614919      9/1994
WO   WO 94/04581  3/1994

OTHER PUBLICATIONS

Properties of Core/Shell Latexes, ACS Polymeric Materials Science & Engineering vol. 80, 1999 (Abstract Only).
Weinmann and Smith, "Performance of Ambient Cure Waterborne Coatings Based on Solid Epoxy Resin Dispersions," Resolution Performance Products, 2001.
Teng and Soucek, "Synthesis of Cycloaliphatic Diepoxide Crosslinkable Core/Shell Latexes," ACS Polymeric Materials Science & Engineering vol. 80, 1999 (Abstract Only).
Teng and Soucek, Effect of Addition Mode of Cycloaliphatic Ciepoxide on the Mechanical.

* cited by examiner

*Primary Examiner*—David Wu
*Assistant Examiner*—Vu Nguyen
(74) *Attorney, Agent, or Firm*—The H.T. Than Law Group

(57) ABSTRACT

The present invention relates to polymers polymerized sequentially or in stages and having varied functionality and/or monomer content as the polymerization progresses, as well as the methods for making these polymers. The polymers according to the invention can advantageously be present in aqueous emulsion or latex form and can advantageously be used in paint compositions.

29 Claims, No Drawings

POLYMERS WITH IMPROVED SHELF STABILITY

FIELD OF THE INVENTION

The present invention relates to a latex containing polymer particles that are polymerized in at least two stages and that have a varying pendant functional group content in the different stages of the polymerization and a method for making same. The latex containing the polymers according to the invention can advantageously be used in paint compositions and architectural coatings.

BACKGROUND OF THE INVENTION

Acrylic latexes are popular components of many products, and have been known for many years. Their ingredients, synthesis methods, and results characterization can have a great impact on their particular end-use, particularly in the area of coating compositions such as paints. Many patents disclose latex compositions of acrylic polymers and copolymers, many for use in the coatings art.

For example, U.S. Pat. No. 5,990,228 discloses aqueous coating compositions containing at least two polymer components which supposedly provide adhesion and improved durability, as measured in dried coatings made from the aqueous compositions by improved gloss retention or dirt pickup resistance. Specifically, in Comparative Example 1 of the '228 patent, this patent discloses the use of a pre-polymerized latex core of 60 nm particulate poly(butyl acrylate-co-methyl methacrylate-co-methacrylic acid), upon which was further polymerized two layers of poly(butyl acrylate-co-methyl methacrylate-co-acrylic acid) of the same composition. Furthermore, all of the Examples in this patent disclose compositions that are polymerized in the presence of these pre-formed 60 nm core latex particles. In addition, each of the Examples of this patent discloses acrylic copolymers having very low proportions of acid monomers (e.g., methacrylic acid and acrylic acid).

Especially in coating applications, the acrylic latexes are typically reacted with a crosslinking component such as an epoxy compound to form a crosslinked coating. Because epoxies are reactive with many different types of functional groups, such as hydroxyls, carboxylic acids, amines, etc., there has been a wide variety of different compositions of acrylic monomers used to attain various properties, such as increased latex stability, acceptable curing behavior with epoxies, etc. Several publications focus on core-shell type acrylic particles having hydroxyl functionality specifically in the core of the particles. In most of these publications, there is also a substantial required glass transition temperature difference between the core polymer and the shell polymer.

For example, International Publication No. WO 94/04581 discloses waterborne latices containing core-shell acrylic particles and that are adapted for spray application into coatings that impart impact resistance, sag resistance, and solvent popping resistance. This publication teaches that the core contains 50-90 wt % acrylic and methacrylic monomers and 1-20 wt % hydroxy-functional monomers so as to form a polymer having a $T_g$ below 0° C. This publication also teaches that the shell contains 40-90 wt % acrylic and methacrylic monomers, 5-20 wt % acid-containing monomers, and 1-20 wt % hydroxy-functional monomers so as to form a polymer having a $T_g$ above 20° C.

In addition, European Patent Application No. EP 0 614 919 A1 describes a latex composition containing core-shell type polymer particles in which the core is made from 50-90 wt % $C_1$-$C_4$ alkanoate monomers and 10-50 wt % monomers being vinyl esters of tertiary saturated carboxylic acids so as to form a polymer having a $T_g$ of at least 10° C., and in which the shell is made from 10-50 Wt % $C_1$-$C_4$ alkanoate monomers and 50-90 wt % monomers being vinyl esters of tertiary saturated carboxylic acids so as to form a polymer having a $T_g$ below 10° C. In addition, the application requires a difference between the $T_g$ values of the core and the shell of at least 5° C.

Further, U.S. Pat. No. 6,723,779 describes a low-temperature film-forming latex based on hydrophobic polymers in which crosslinking monomers, such as dienes, divinyl acrylates, polyvinyl compounds, and the like, are used so that the composition is self-curing. This patent also teaches that the latex polymers have a core-shell morphology in which 70-90 wt % of the particle is the core polymer having a $T_g$ below 20° C. and 10-30 wt % of the particle is the shell polymer having a $T_g$ above 50° C.

As shown, for example, in European Patent Application No. EP 0 614 919 A1 and in U.S. Pat. No. 6,723,779 above, other ways to attain various properties, such as stability, corrosion resistance, weatherability, and the like, in the latex particles and the coatings made therefrom include copolymerizing the acrylic monomers with different types of comonomers. One known comonomer is acrylamide. However, the use of acrylamide can cause health and disposal issues, and it is desirable to find other ways to improve these properties without adding increased toxicity to the latex particles and the products made therefrom.

Thus, there remains a need for an acrylic-based sequentially polymerized (or core-shell type) polymer latex having the capability of readily reacting with a crosslinking component such as an epoxy and which exhibits desirable properties without undue toxicity.

BRIEF SUMMARY OF THE INVENTION

One aspect of the invention relates to an acrylic latex comprising sequentially polymerized polymer particles formed in at least two polymerization stages so as to form a first phase, which results from a first polymerization stage, and a second phase, which results from a second polymerization stage, wherein:

(a) water, a surfactant, a first set of monomers that form the first phase and that comprise at least one polymerizable epoxy-reactive monomer and at least one polymerizable diluent monomer, a second set of monomers that form the second phase and that comprise at least one polymerizable epoxy-reactive monomer and at least one polymerizable diluent monomer, an initiator, optionally an organic solvent, optionally a pH adjustor, optionally a chaser solution, and optionally a preservative are combined in the latex under conditions sufficient to form the sequentially polymerized polymer particles;

(b) the first set of monomers has a first acid content, the second set of monomers has a second acid content, and the first acid content is lower than the second acid content;

(c) both the first set of monomers and the second set of monomers are substantially free from hydroxyl-functional epoxy-reactive monomers;

(d) the glass transition temperatures of the first phase polymer formed by the first set of monomers and of the second phase polymer formed by the second set of monomers are both above about 20° C.; and (e) the sequentially polymerized polymer particles of the acrylic latex are substantially free from pre-polymerized polymer particles that were not formed during any of the at least two polymerization stages.

In one preferred embodiment: (i) the first set of monomers comprises from about 3% to about 6% by weight of methacrylic acid and diluent monomers selected from the group consisting of butyl acrylate, methyl methacrylate, 2-ethylhexyl acrylate, styrene, and combinations thereof; (ii) the second set of monomers comprises from about 8% to about 15% by weight of methacrylic acid and diluent monomers selected from the group consisting of butyl acrylate, methyl methacrylate, 2-ethylhexyl acrylate, styrene, and combinations thereof; and (iii) both the first and the second initiator solutions comprise water and ammonium persulfate.

Another aspect of the invention relates to an acrylic-based latex paint composition comprising an acrylic latex comprising sequentially polymerized polymer particles according to the invention, water, a coalescence solvent, optionally a pH adjustor, a surfactant, a defoamer, a pigment, optionally a dispersant, optionally an anticorrosive agent, optionally a rheology modifier, and optionally a preservative.

Another aspect of the invention relates to a two-pack acrylic-epoxy paint comprising a first compartment comprising an acrylic-based latex paint composition according to the invention and a second compartment comprising an epoxy composition that comprises an epoxy-functional compound and optionally a catalyst.

Another aspect of the invention relates to a method for forming sequentially polymerized polymer particles in a latex comprising the steps of:

(i) providing an aqueous emulsion in a reaction vessel;

(ii) adding a first initiator solution to the aqueous emulsion to form an initiating emulsion;

(iii) adding a first set of monomers having a first acid content to the initiating emulsion to form a polymerizable emulsion;

(iv) sequentially following the adding of the first set of monomers, optionally co-adding an intervening set of monomers and an intervening initiator solution to the polymerizable emulsion;

sequentially following the adding of the optional intervening set of monomers, co-adding a second set of monomers having a second acid content and a second initiator solution to the polymerizable emulsion;

sequentially polymerizing the first set of monomers to form a first phase of each of the polymer particles and the second set of monomers to form a second phase of each of the polymer particles, with the optional intervening set of monomers being polymerized therebetween, to form a sequentially polymerized emulsion;

optionally adding water to rinse the sequentially polymerized emulsion;

optionally adding a chaser solution to the sequentially polymerized emulsion; and optionally adding an additive solution to help stabilize the sequentially polymerized emulsion.

Advantageously, the sequential adding steps for the second set of monomers and for the optional intervening set of monomers are performed either (a) immediately after the step of adding the first set of monomers, the optional intervening set of monomers, or both, or (b) after a period of time has elapsed, but without manipulating, isolating, purifying, or separating any polymerized particle comprising the first phase from the polymerizable emulsion. Also advantageously, the sequentially polymerized polymer particles of the latex are substantially free from pre-polymerized polymer particles that were not formed during the steps of adding any of the sets of monomers.

In one preferred embodiment: (i) the first set of monomers comprises from about 3% to about 6% by weight of methacrylic acid and diluent monomers selected from the group consisting of butyl acrylate, methyl methacrylate, 2-ethylhexyl acrylate, styrene, and combinations thereof; (ii) there is no intervening set or monomers or intervening initiator solution; (iii) the second set of monomers comprises from about 8% to about 15% by weight of methacrylic acid and diluent monomers selected from the group consisting of butyl acrylate, methyl methacrylate, 2-ethylhexyl acrylate, styrene, and combinations thereof; and (iv) both the first and the second initiator solutions comprise water and ammonium persulfate. In another preferred embodiment, an acrylic latex comprising sequentially polymerized polymer particles can be made according to the aforementioned method.

Another aspect of the invention relates to a method for forming an acrylic-epoxy paint comprising performing the steps of the method for forming sequentially polymerized polymer particles in a latex discussed above and further comprising the steps of: (i) adding the sequentially polymerized emulsion to a paint base composition comprising water, a coalescence solvent, optionally a pH adjustor, a surfactant, a defoamer, a pigment, optionally a dispersant, optionally an anticorrosive agent, optionally a rheology modifier, and optionally a preservative to form an acrylic-based latex paint composition; and (ii) mixing the acrylic-based latex paint composition with an epoxy composition comprising an epoxy-functional compound and optionally a catalyst.

DETAILED DESCRIPTION OF THE INVENTION

One aspect of the present invention relates to a latex containing polymer particles that are polymerized in at least two stages so as to form two distinct phases, typically a bulk or first phase (core), the result of a first latex polymerization stage, and a surface or second phase (shell), the result of a second latex polymerization stage. As the first phase and the second phase are formed sequentially, the first and second phases of the polymer particles can be not only internal and external, respectively, forming a core-shell morphology, but, additionally or alternately, neighboring/connected to each other. The first phase usually comprises at least about 25% by weight, preferably at least about 35% by weight, of a polymer particle, with the second phase comprising the from about 15% to about 40% by weight, preferably from about 20% to about 30% by weight, of the polymer particle. In a preferred embodiment, there are two polymerization stages, forming only a first phase and a second phase, such that the first phase thus comprises from about 60% to about 85% by weight, preferably from about 70% to about 80% by weight, of the polymer particle.

The polymer particles according to the invention are typically polymerized in a latex system comprising water, surfactant, the desired monomer(s), an initiator, optionally an organic solvent, optionally a pH adjustor, optionally a chaser solution, and optionally a preservative, which can be added at various times.

Examples of surfactants useful in the compositions according to the invention can include, but are not limited to, nonionic and/or anionic surfactants such as ammonium nonoxynol-4 sulfate, nonylphenol ethoxylate(10), octylphenol ethoxylate(9-10), sodium dodecyl sulfonate, sodium tetradecyl sulfonate, sodium hexadecyl sulfonate, those sold under the tradename Triton™ (e.g., QS series, CF series, X series, and the like), those sold under the tradename Rhodapon™, those sold under the tradename Rhodapex™, those sold under the tradename Rhodacal™, and the like, and combinations thereof.

Examples of initiators and chaser solutions useful in the compositions according to the invention can include, but are not limited to, ammonium persulfate, redox systems such as sodium hydroxymethanesulfinate (reducer) and t-butyl-hydroperoxide (oxidizer), and the like, and combinations thereof, typically in an aqueous solution. Either or both of these components can optionally contain an additional surfactant and/or a pH adjustor, if desired to stabilize the emulsion.

Examples of pH adjustors useful in the compositions according to the invention can include, but are not limited to, ammonium hydroxide, sodium hydroxide, sodium carbonate, sodium bicarbonate, potassium hydroxide, potassium carbonate, potassium bicarbonate, ammonia, and the like, and combinations thereof. In certain cases, compounds that qualify as pH adjustors can be added for purposes other than adjusting pH, e.g., emulsion stabilization, and yet are still characterized herein as pH adjustors.

Examples of coalescence solvents and organic solvents useful in the compositions according to the invention can include, but are not limited to, 2-ethylhexyl ether of ethylene glycol (e.g., commercially available as Eastman™ EEH solvent), methyl carbitol, propylene glycol, ethylene glycol, those compounds sold under the tradename TEXANOL™, plasticizers such as dibutyl phthalate, and the like, and combinations thereof.

Examples of dispersants useful in the compositions according to the invention can include, but are not limited to, 2-amino-2-methyl-1-propanol, hydrophobic copolymers such as Tamol™ 165A, and combinations thereof.

Examples of biocides/preservatives useful in the compositions according to the invention can include, but are not limited to, hydroxy-functional aza-dioxabicyclo compounds such as those commercially available from ISP under the tradename Nuosept™ 95.

In the latex polymer particles of the present invention, the first phase and the second phase are both made from a mixture of monomers having both pendant ester groups and pendant carboxylic acid groups. The pendant acid groups are necessary for later coalescence and crosslinking of the polymer particles with a crosslinking agents, e.g., an epoxy composition.

Typically, the first phase should exhibit a lower acid monomer content than that of the second phase. Without being bound by theory, it is believed that a lower first phase acid monomer content results in fewer sites/opportunities for chemical reaction and degradation, while the higher second phase acid monomer content allows for acceptable coalescence/crosslinking of the polymer particles with the epoxy composition. Without being bound by theory, it is believed, however, that acid contents that are too high in either the first phase or the second phase can cause shelf-life instability and reduced usefulness of the sequentially polymerized polymer particles having such high acid contents.

In a preferred embodiment, the first phase can have an average acid monomer content of less than about 9% by weight, preferably from about 1% to about 8%, more preferably from about 2% to about 6%, for example from about 3% to about 6%. In another preferred embodiment, the first phase can have an average acid monomer content from about 2.8% to about 9% by weight. Also preferably, the second phase can have an acid monomer content from about 2% to about 15% by weight more than that of the first phase, preferably from about 3% to about 12% by weight more than that of the first phase, more preferably from about 4% to about 10% by weight more than that of the first phase. In another preferred embodiment, the second phase can have an acid monomer content from about 6% to about 20% by weight, preferably from about 7% to about 17% by weight, more preferably from about 8% to about 15% by weight. Although the acid content is described herein in terms wt % monomer, acid content can be quantified in many ways, e.g., acid number. Thus, the first phase of the polymer particles should also necessarily have a correspondingly lower acid number than the second phase of the polymer particles.

In a preferred embodiment, the monomers polymerized to form the first phase and the second phase can be similar in chemistry but exhibit different contents of acid monomers. In this embodiment, the glass transition temperature of the polymer comprising the first phase will typically be similar to the glass transition temperature of the polymer comprising the particle second phase. Typically, the difference between the glass transition temperatures of the first phase and the second phase is less than about 10° C., for example less than about 7° C. or, in some cases, not more than about 5° C. Also, in the preferred embodiments where the first phase has a lower acid content than the second phase, the glass transition temperature of the first phase will typically also be slightly lower than the glass transition temperature of the second phase. Though the glass transition temperatures of the first phase and the second phase are not believed to be critical parameters and typically depend upon the end-use of the latexes, the $T_g$ values of the polymerized first phase and the polymerized second phase are typically both above about 20° C. In a preferred embodiment, the $T_g$ values of the polymerized first phase and the polymerized second phase can both fall within the range from about 25° C. to about 90° C., preferably from about 30° C. to about 80° C.

In a preferred embodiment, the $T_g$ values for both the second phase and first phase of the particles can be completely calculated by applying Fox's law to known $T_g$ values, e.g., from any edition of the *Polymer Handbook* such as the $3^{rd}$ ed. (1989), of the homopolymers corresponding to each of the monomers used and their respective weight ratios. For descriptions of this method, see, e.g., U.S. Pat. No. 6,723,779 and/or International Publication No. WO 94/04581, the disclosures of both of which are incorporated herein by reference in their entireties.

Many different functional groups may be suitable as pendant groups on the polymers according to the invention. Although the acrylic polymers according to the invention have been described in terms of their acid content, it should be understood that the term "acid content" should include not merely the content of carboxylic acid-containing monomers, but the combined content of any monomers having pendant groups that are capable of reacting with epoxy-functional compounds. Further, as used herein, the terms "polymer" and "polymers" are used to refer to oligomers, adducts, homopolymers, random copolymers, statistical copolymers, alternating copolymers, periodic copolymer, bipolymers, terpolymers, quaterpolymers, other forms of copolymers, substituted derivatives thereof, and combinations of two or more thereof. Such polymers can be linear, branched, hyperbranched, crosslinked, block, di-block, multi-block, graft, isotactic, syndiotactic, stereoregular, atactic, gradient, multi-arm star, comb, dendritic, and/or any combination thereof.

Examples of polymer repeat units having epoxy-reactive functional groups can include, but are not limited to, acrylic acid, ionic acrylate salts, alkacrylic acids, ionic alkacrylate salts, haloacrylic acids, ionic haloacrylate salts, polymerizable anhydrides such as maleic anhydride, acrylamide, alkacrylamides, monoalkyl acrylamides, monoalkyl alkacrylamides, alkacrylamidoalkyl ethyleneureas such as those sold under the tradename Sipomer™ WAM, alkenyloxyamidoalkyl ethyleneureas such as those sold under the tradename Sipomer™ WAM, vinyl dicarboxylic organic acids (e.g., itaconic acid, glutaconic acid, maleic acid, angelic acid, fumaric acid, tiglic acid, and the like), monoalkyl esters of vinyl dicarboxylic organic acids (e.g., methyl maleate, ethyl fumarate, and the like), monoisopropenyl esters of saturated, vinyl dicarboxylic organic acids, and the like, and copolymers and combinations thereof.

As used herein, the prefix "alk" before an ethylenically unsaturated monomer should be understood to indicate a $C_1$-$C_6$ hydrocarbon side group attached to either carbon of the olefinic pendant group, though it usually refers to a group attached to the same carbon as the olefinic pendant group. For example, the most basic alkacrylic acid is methacrylic acid. However, if the "alk" group is on the vinyl carbon not containing the pendant carboxylic acid, then a methacrylic acid becomes crotonic acid, which is contemplated as an alkacrylic acid, as defined herein. Another example includes tiglic acid (i.e., 2-butene-2-carboxylic acid), which is an alkacrylic acid containing two "alk" groups, with one methyl group attached to each vinyl carbon. As used herein, the term "alkyl" should be understood to mean an aliphatic $C_1$-$C_{18}$ hydrocarbon moiety. For instance, the monomer ethyl methacrylate has a methyl group attached as an ester to the pendant carboxylate group and an ethyl group attached to the same carbon of the vinyl moiety as the pendant carboxylate (i.e., $CH_2=C(CH_2CH_3)-C(=O)O(CH_3)$). As used herein, "alkenyl" should be understood to mean a $C_2$-$C_{18}$ hydrocarbon moiety having a single double bond, preferably a terminal double bond.

In the embodiments where the polymer repeat units include ionic salts, their counterions can include, but are not limited to, sodium, potassium, lithium, copper, silver, ammonium, tetraalkyl ammonium, alkyl pyridinium ions such as N-methyl pyridinium, tetraalkyl phosphonium ions, tetraaryl phosphonium ions, aralkyl phosphonium ions such as methyltriphenylphosphonium and methyltriphenoxyphosphonium, trialkylsulfonium ions such as trimethylsulfonium, aralkyl sulfonium ions, trialkylsulfoxonium ions such as trimethylsulfoxonium, aralkyl sulfoxonium ions, and the like, and combinations thereof. As used herein, the term "aryl" should be understood to mean an aromatic $C_5$-$C_{18}$ moiety, and the term "aralkyl" should be understood to mean a moiety that is partially aryl and partially alkyl.

In one embodiment, at least the first phase monomers, and typically also the second phase monomers, can be substantially free from hydroxy-functional pendant groups such as, but not limited to, those in hydroxyalkyl acrylates, hydroxyalkyl alkacrylates, vinyl phenols, hydroxyalkyl vinyl benzenes, only partially esterified acrylate esters of alkylene glycols, only partially esterified acrylate esters of non-polymeric polyhydroxy compounds like glycerol, only partially esterified acrylate esters of polymeric polyhydroxy compounds, and the like. One reason for this is that hydroxyl groups can make the polymer particles more water-sensitive, and it can affect the latex stability, which can be undesirable in some cases. In another embodiment, both the first phase monomers and the second phase monomers can be substantially free from conjugated diene monomers such as, but not limited to, butadienes, hexadienes, hexatrienes, octadienes, octatrienes, octatetrenes, as well as hydrocarbon analogs thereof, substituted halo- and/or cyano-derivatives thereof, and the like, and a combination thereof. One reason for this is that conjugated diene monomers can cause crosslinking, which may be undesirable in some cases. Another reason for this is that conjugated diene monomers can reduce the polymer glass transition temperature below desirable levels.

As used herein, the terms "substantially no" and "substantially free from", referring to a component in a composition, mean that the composition comprises not more than about 1 wt %, preferably not more than about 0.5 wt %, more preferably not more than about 0.1 wt %, most preferably not more than about 0.02 wt %, or in some cases completely none (about 0%), of the component.

Optionally, in addition to the epoxy-reactive functionality, the polymers according to the invention can also comprise diluent monomers or repeat units that contain pendant groups that do not typically react with epoxy-functional compounds. Examples of such diluent monomers can include, but are not limited to, alkyl acrylates, alkyl alkacrylates, alkyl esters of vinyl monocarboxylic organic acids other than acrylates and alkacrylates (e.g., ethyl tiglate, methyl crotonate, and the like), dialkyl esters of vinyl dicarboxylic acids, styrene, alkylstyrenes (e.g., α-ethylstyrene, α-methylstyrene, vinyl toluene, 2,4-dimethylstyrene, 4-t-butylstyrene, and the like), halostyrenes (e.g., α-bromostyrene, 2,6-dichlorostyrene, and the like), isopropenyl esters of saturated, monocarboxylic organic acids (e.g., isopropenyl acetate, isopropenyl isobutyrate, and the like), monoisopropenyl monoalkyl esters of saturated, dicarboxylic organic acids (e.g., isopropenyl alkyl oxalate, isopropenyl alkyl succinate, and the like), vinyl carboxylate alkyl ethers (e.g., vinyl acetate, vinyl propionate, vinyl butyrates, vinyl benzoates, halo-substituted versions thereof such as vinyl chloroacetate, and the like), vinyl alkyl ethers, acrylonitrile, alkacrylonitriles, dialkyl acrylamides, dialkyl alkacrylamides, allyl compounds (e.g., allyl chloride, allyl esters of saturated, monocarboxylic acids, allyl alkyl esters of saturated, dicarboxylic organic acids, and the like), and the like, and combinations thereof. Preferred diluent monomers include, but are not limited to, $C_1$-$C_8$ alkyl acrylates, $C_1$-$C_8$ alkyl $C_1$-$C_2$ alkacrylates, styrene, $C_1$-$C_4$ alkylstyrenes, vinyl acetate, and combinations thereof.

Acrylic latex copolymers containing acrylonitrile are known in the art to improve certain physical properties as compared to non-acrylonitrile-containing acrylics, but can significantly increase cost and can introduce undesirable environmental issues. Thus, in one embodiment, the diluent monomers specifically do not include acrylonitrile and alkacrylonitriles. It has been discovered that sequentially polymerized acrylic polymers according to the invention can have comparable, or even superior, properties to (alk)acrylonitrile-containing acrylics with relatively little, if any, increased cost/environmental impact.

It is known in the prior art to form sequentially polymerized-type acrylic latex polymers by pre-polymerizing monomers into core particles, and then manipulating, isolating, purifying, and/or separating the core particles before forming an acrylic shell around the core particles. See, e.g., U.S. Pat. No. 5,990,228, Comparative Example 1 at columns 4-5 (specifically column 4, line 43), for the use of a pre-formed core. All of the Examples in the '228 patent further disclose compositions that are polymerized in the presence of this pre-formed core. The sequentially polymerized latex polymers according to the invention also specifically exclude the use of pre-polymerized and/or isolated/purified polymer particles not only between stages of sequential polymerization but also prior to the first stage of sequential polymerization. For instance, the sequentially polymerized latex polymers according to the invention do not contain pre-polymerized and/or isolated/purified polymer particles as even a portion of the first phase.

Typically, neither the first phase monomers nor the second phase monomers of the acrylic polymer particles contain any crosslinking monomers or crosslinking agents. This is at least partially due to the fact that the polymer particles according to the invention are typically polymerized in a latex system, which can either stand alone or which can then be combined with other components to form compositions for particular applications. In one embodiment, the latex containing the polymer particles can be used as part of a two-pack acrylic-epoxy coating package useful, for example, in architectural coatings and paint formulations. In another embodiment, the latex can also be combined with one or more colorant compositions in hydrophobic latexes.

In another aspect of the invention relating to a two-pack acrylic-epoxy coating package, the polymeric latex can be included in a paint composition, which can advantageously be an emulsion further containing water, a coalescence solvent, a pH adjustor, a surfactant, a defoamer, a pigment, optionally an anticorrosive agent, optionally but preferably a dispersant, optionally but preferably a rheology modifier, and optionally but preferably a biocide or preservative.

Examples of defoamers useful in the paint compositions according to the invention can include, but are not limited to, polysiloxane-polyether copolymers such as those sold by Tego under the tradename Foamex™, those sold under the tradename BYK™, those sold under the tradename Drewplus™, those sold under the tradename Surfynol™, and the like, and combinations thereof.

Examples of anticorrosive agents useful in the paint compositions according to the invention can include, but are not limited to, sodium nitrite and the like.

Examples of rheology modifiers useful in the paint compositions according to the invention can include, but are not limited to, those commercially available from Rohm & Haas under the tradename Acrysol™, such as RM-2020 NPR and RM-825.

While typically multiple pigments/colorants are present in end-use latexes that are to be used in paint or architectural coating applications, sometimes only a white pigment, such as a zinc oxide and/or a titanium oxide, is added in the early stages of the formation of the paint composition (e.g., in the base composition). In such a case, any other desired pigments/colorants of various colors (including more white pigment) can optionally be added at the later stages of, or after, formation of the paint composition. Examples of pigments/colorants useful according to the invention can include, but are not limited to, carbon black, iron oxide black, iron oxide yellow, iron oxide red, iron oxide brown, organic red pigments, including quinacridone red and metallized and non-metallized azo reds (e.g., lithols, lithol rubine, toluidine red, naphthol red), phthalocyanine blue, phthalocyanine green, mono- or di-arylide yellow, benzimidazolone yellow, heterocyclic yellow, DAN orange, quinacridone magenta, quinacridone violet, and the like, and any combination thereof. These exemplary color pigments can be added as powders, but can more conveniently be added as aqueous dispersions to paint compositions according to the invention.

Additionally or alternately, extender pigments/colorants can be added, e.g., to the grind composition portion of the paint composition. Examples of extender pigments/colorants useful in the paint compositions according to the invention can include, but are not limited to, silica, silicates, carbonates such as calcium carbonates, and the like, and combinations thereof.

The paint compositions containing the sequentially polymerized polymer particles according to the invention can exhibit a wide range of viscosities, depending upon the application. In one embodiment, the viscosity of the sequentially polymerized latex can be from about 65 to about 130 Krebunits (KU), preferably from about 70 to about 110 KU, more preferably from about 75 to about 105 KU. While coalescence, degradation, and other factors can cause the viscosity to increase over time, it is preferable that the viscosity not increase beyond about 130 KU, preferably not beyond about 120 KU, more preferably not beyond about 115 KU, and in some cases not beyond about 110 KU.

Advantageously, the paint compositions containing the sequentially polymerized polymer particles according to the invention can exhibit good viscosity stability after composition preparation, while sitting "on the shelf". Maintaining viscosity stability can be crucial to maintaining shelf-life and can lead to good shelf stability. Shelf stability can be quantified in many ways. For instance, when measuring viscosity stability, a significant increase in the viscosity from just after composition preparation to as long as 30 days thereafter at ambient temperature (e.g., between about 20° C. and about 30° C.) can indicate a poor shelf stability. In another example measuring incubation stability, a significant increase in the viscosity from just after composition preparation to as long as 30 days thereafter at elevated temperature (e.g., about 120° F.) can indicate a poor shelf stability.

In one preferred embodiment, the viscosity increase between the paint composition prepared soon after polymerization and the paint composition after 30 days at elevated temperature is not more than about 20 KU, preferably not more than about 15 KU, more preferably not more than about 10 KU, and in some cases not more than about 5 KU. In another preferred embodiment, the viscosity increase between the paint composition prepared soon after polymerization and the paint composition after 30 days at elevated temperature is not more than about 25 KU, preferably not more than about 20 KU, more preferably not more than about 15 KU, most preferably not more than about 10 KU.

The latexes and/or paint compositions containing the sequentially polymerized polymer particles according to the invention can advantageously exhibit a pH from about 6 to about 10, although the pH needs only to be sufficient to maintain the stability of the particular latex and/or paint composition in combination with the surfactant(s) and other stabilizing components.

Particularly in two-pack acrylic epoxy package applications, the sequentially polymerized latex polymer particles according to the invention can subsequently be reacted with an epoxy composition comprising an epoxy-functional compound and an optional catalyst. The epoxy-functional compound can include, but is not limited to glycidyl ethers such as alkyl glycidyl ethers, alkylene glycol diglycidyl ethers, allyl glycidyl ethers, DGEBA and self-reaction products thereof, neopentyl glycol diglycidyl ether, Novolac glycidyl ether, and the like, and combinations thereof; glycidyl esters such as those sold under the tradename Cardura™, alkyl glycidyl esters, fatty acid glycidyl esters, phenyl glycidyl ester, phthalic acid diglycidyl ester, poly(acrylic acid glycidyl ester) and copolymers thereof with other acrylic monomers, poly(alkacrylic acid glycidyl ester)s and copolymers thereof with other acrylic monomers, and the like, and combinations thereof; and the like; and combinations thereof.

The optional catalyst can include, but is not limited to, nitrogen-containing compounds in which there is at least one nitrogen-hydrogen bond, e.g., amines, amides, ureas, and the like. Listed in relative order of catalytic capacity, primary amines are preferred over secondary amines, which are preferred over amides and then ureas. Although an epoxy catalyst is optional in the epoxy compositions according to the invention, a catalyst may be unnecessary when the second phase of the polymer particle contains repeat units having not fully nitrogen-substituted pendant amines, amides, and/or ureas in a collective amount of more than about 2% by weight of the second phase, preferably more than about 5% by weight of the second phase. Examples of such NH-containing repeat units include, but are not limited to, acrylamide, alkacrylamides, monoalkyl acrylamides, monoalkyl alkacrylamides, aminoalkylstyrenes, aminostyrene, ethyleneureafunctional monomers, and the like, and combinations and copolymers thereof.

Optionally, the epoxy composition may contain other components, as necessary, which can include, but are not limited to, organic solvents as diluents, additional colorants or pigments, and the like, and combinations thereof.

Whether in combination with a crosslinking composition, in a paint composition, or by itself, the acrylic latexes according to the invention are typically applied to a substrate. The substrate may or may not depend upon the product in which acrylic latex according to the invention is used. For example, when the acrylic latex is used in a stain composition, the substrate can typically be wood or the like. Examples of substrates can include, but are not limited to: wood, including natural wood, compressed particulate wood, faux or artificial wood, wood composites, and the like, and combinations thereof; metals, including metal alloys, metal composites, coated metals, metallic surfaces, and the like, and combinations thereof; ceramics, including metal oxides, metal nitrides, metal oxynitrides, metal sulfides, metal carbides, and the like, and combinations thereof; transparent and/or translucent substrates such as glasses, polycarbonates, acrylics, styrenics, and the like, and combinations thereof; polymers; woven and/or non-woven fabrics; chalky substrates; building materials such as sheet rock; and the like; and combinations thereof.

In another aspect of the invention, the latex containing the sequentially polymerized polymers according to the invention is advantageously created using a sequential polymerization method having at least two stages, the first forming the first phase of the particles and the second forming the second phase of the particles. In a preferred embodiment, the sequential polymerization occurs in two stages, with the second stage being the last stage.

A conventional acrylic latex polymerization typically involves a single charge of monomer that is introduced/emulsified, initiated, and polymerized to form acrylic polymer particles. However, a two-stage sequential latex polymerization according to the invention can involve the following: a first introduction, initiation, and polymerization of a first charge of monomer to form the first phase; and, immediately thereafter, a second introduction of a second charge of monomer and co-polymerization of that second charge of monomer with the first phase to form a second phase. Multi-stage sequential latex polymerizations according to the invention specifically exclude actively manipulating, isolating, purifying, and/or separating the first phase in/from the latex in between the first polymerization of the monomers that form the first phase and the second introduction of the monomers that form the second phase.

A multi-stage sequential latex polymerization according to the invention can occur in the following manner. First, an initial kettle charge containing water, optionally but preferably a surfactant, and optionally an organic solvent is placed in a reaction vessel and brought to a polymerization temperature. The polymerization temperature can be tailored to the particular initiators/monomers in the polymerization. For example, when ammonium persulfate is used as the initiator for acrylic and styrenic monomers, the polymerization temperature can be between about 70° C. and about 90° C., preferably between about 75° C. and about 85° C., for example about 80° C. When the initial kettle charge and the reaction vessel are at temperature, a seed amount of a first emulsion containing water, a surfactant, an epoxy-reactive monomer, a diluent monomer, and optionally a pH adjustor can then be added. A first solution containing water and initiator can thereafter be added to the emulsion. A seed amount of monomer, in combination with the initiator solution, should be sufficient to allow the polymerization to begin. In one embodiment, the seed amount can represent about 1% to about 10%, for example from about 3% to about 6%, of the weight of the first emulsion. When the sequential polymerization includes only two stages, the proportion of monomers added in this first emulsion can advantageously represent the desired composition of the first phase.

Typically, a short period of time such as about 15 minutes, is allowed for the initiator solution and the monomer emulsion to reach the polymerization temperature and to for polymerization to begin. Thereafter, the remainder of the first emulsion can be added to the reaction vessel, either continuously or in multiple sequential charges, along with a second solution containing water and initiator. The first emulsion can advantageously contain at least about 25 wt %, preferably at least about 45 wt %, more preferably at least about 60 wt %, for example at least about 75 wt % of the total monomer content. The first emulsion can also advantageously contain no more than about 90 wt %, preferably no more than about 85 wt %, more preferably no more than about 80 wt % of the total monomer content.

When all of the first emulsion has been added, immediately thereafter a second emulsion is co-added with the second solution. The second emulsion contains water, a surfactant, an epoxy-reactive monomer, a diluent monomer, and optionally a pH adjustor. The rates of addition of the first and second emulsions and the second solution can advantageously be tailored to be appropriate to the reaction conditions and the nature of the reactants in the polymerization. Nevertheless, the rate of addition of the second initiator solution should typically be such that the second solution is co-added during both the addition of the remainder of the first emulsion and the addition of the second emulsion.

If the sequential polymerization comprises more than two stages, and thus includes adding more than two distinct monomer emulsions, the intervening monomer emulsions and the intervening initiator solutions can be co-added after the completion of adding the remainder of the first emulsion and before the co-addition of the second monomer emulsion and the second initiator solution. Hence, the terms "first" and "second", as used herein, do not connote numerical order, instead indicating a difference between two items otherwise described using the same name; these terms are used similarly to "one" and "another" herein. To clarify, when the sequential polymerization comprises more than two stages, there may be a single intervening stage (three-stage polymerization), two intervening stages (four-stage polymerization), or more than two intervening stages.

In one embodiment, the sequential addition of the monomer emulsions can occur for a period of about 2 to about 5 hours, preferably from about 3 to about 4 hours, for example about 210 minutes. After the additions of monomer and initiator have ended, a sufficient polymerization time is allowed. This polymerization time can be, in one embodiment, from about ½ hour to about 2 hours, for example about 1 hour. When the sequential polymerization includes only two stages, the proportion of monomers added in the second emulsion can advantageously represent the desired composition of the second phase.

After the polymerization has run its course, the contents of the reaction vessel can advantageously be rinsed with water. Also optionally but preferably, a chaser solution containing water, a redox initiator system comprising an oxidizing agent and a reducing agent, and optionally a surfactant can be added to the reaction vessel. The primary purpose of the chaser solution, when present, is to react with, and thus devolatilize, any residual monomers and/or low molecular weight oligomers from the polymerization. Following the optional addition of the chaser solution, a stabilizing solution containing water and a pH adjustor and/or a biocide/preservative can optionally be added to the reaction vessel to help stabilize the latex emulsion. A coalescence solvent may optionally be added at a later stage.

If more than a second stage of sequential polymerization is undertaken according to the aforementioned multi-stage sequential latex polymerization method, each of the monomer emulsions from the second stage to the last stage should immediately and sequentially follow the addition of the remainder of the first monomer emulsion and should also be co-added with the second initiator solution. As used herein, the term "immediately," at least in relation to the occurrence of two actions in a chemical process, should be understood to mean that the two actions occur temporally within seconds of each other or within a reasonably small amount of time, and without any intervening actions, so as to have little or no effect on the outcome of the chemical process.

Also, similarly to the second monomer emulsion, each additional monomer emulsion should contain water, a surfactant, an epoxy-reactive monomer, a diluent monomer, and optionally a pH adjustor. Further, when the sequential polymerization includes more than two stages, the proportion of monomers added in the last stage emulsion can advantageously represent the desired composition of the second phase. In addition, if the relative contents of the various monomers change-constantly and/or if there are a large number of stages having different relative monomer contents, the multi-stage polymerization can be considered a gradient polymerization.

In one embodiment, a paint composition containing sequentially polymerized latex particles according to the invention can be formulated according to the following method. First, a pigment dispersion composition, or grind, is formed by: combining an organic solvent, water, a dispersant, a pH adjustor, a surfactant, a defoamer, a colorant/pigment, and a biocide/preservative; stirring and optionally grinding for a period of time to sufficiently mix the ingredients; and, while continuing to stir and/or grind, adding more water. To this pigment dispersion composition can be added a latex containing sequentially polymerized polymer particle according to the invention, followed by a pH adjustor, if desired, and a performance additive composition comprising an organic solvent, a surfactant, and a defoamer. Optionally but preferably, an anticorrosive solution can then be added. Then, a rheology modifier can be added, optionally including more water, if desired, and also a pH adjustor, thus forming a paint composition. Furthermore, if desired, more colorant(s) and/or pigment(s) can be added to the paint composition either to compliment the (white) pigment(s)/colorant(s) already in the pigment dispersion composition or to add another desired color to the paint composition. A coalescence solvent may optionally be added later.

EXAMPLES

The following Examples are merely illustrative of certain embodiments of the invention and contain comparisons of compositions and methods according to the invention with the prior art and/or embodiments not according to the invention. The following Examples are not meant to limit the scope and breadth of the present invention, as recited in the appended claims.

Example 1

Latex Containing Stage-Polymerized Particles According to the Invention

Example 1 describes an acrylic sequentially polymerized latex with polymer particles having a first phase with about 5% acid content and about 95% diluent monomers, about 49% of which are alkyl acrylate-based and about 46% of which are styrenic, and a second phase with about 10% acid content and about 90% diluent monomer, about 46% of which are alkyl acrylate-based and about 44% of which are styrenic. The first phase is about 80% of the particle; the second phase is about 20% of the particle. The latex composition, in order of addition, is described below in Table 1.

TABLE 1

| Ingredients | Amount (grams) | Monomer % per stage |
|---|---|---|
| Initial kettle charge | | |
| water | 880 | |
| RHODAPON UB | 2.5 | |
| First Monomer Emulsion | | |
| water | 160 | |
| RHODAPON UB | 28 | |
| butyl acrylate | 74.4 | 9.0 wt % |
| methacrylic acid | 42.4 | 5.1 wt % |
| methyl methacrylate | 168 | 20.3 wt % |
| styrene | 384 | 46.3 wt % |
| 2-ethylhexyl acrylate | 160 | 19.3 wt % |
| IGEPAL CO-630 | 3.2 | |
| First Initiator Solution | | |
| water | 30 | |
| ammonium persulfate | 5 | |
| Second Monomer Emulsion | | |
| water | 40 | |
| RHODAPON UB | 7 | |
| butyl acrylate | 18.6 | 8.5 wt % |
| methacrylic acid | 21.6 | 9.9 wt % |
| methyl methacrylate | 42 | 19.2 wt % |
| styrene | 96 | 44.0 wt % |
| 2-ethylhexyl acrylate | 40 | 18.3 wt % |
| IGEPAL CO-630 | 0.8 | |
| Second Initiator Solution | | |
| water | 40 | |
| ammonium persulfate | 2 | |
| water (rinse) | 30 | |
| Chaser Solutions | | |
| t-butyl hydroperoxide | 1.4 | |
| water | 10 | |
| RHODAPON UB | 0.3 | |
| sodium hydroxymethanesulfinate | 1 | |
| water | 15 | |

TABLE 1-continued

| Ingredients | Amount (grams) | Monomer % per stage |
|---|---|---|
| Stabilizer Solution | | |
| ammonium hydroxide (28-30%) | 10 | |
| water | 10 | |

Example 2

Latex Containing Stage-Polymerized Particles According to the Invention

Example 2 describes an acrylic sequentially polymerized latex with polymer particles having a first phase with about 5% acid content and about 95% diluent monomers, about 49% of which are alkyl acrylate-based and about 46% of which are styrenic, and a second phase with about 10% acid content and about 90% diluent monomer, about 46% of which are alkyl acrylate-based and about 44% of which are styrenic. The first phase is about 80% of the particle; the second phase is about 20% of the particle. The latex composition, in order of addition, is described below in Table 2.

TABLE 2

| Ingredients | Amount (grams) | Monomer % per stage |
|---|---|---|
| Initial kettle charge | | |
| water | 880 | |
| RHODACAL AL246/L | 2.5 | |
| First Monomer Emulsion | | |
| water | 160 | |
| RHODACAL AL246/L | 25 | |
| butyl acrylate | 74.4 | 9.0 wt % |
| methacrylic acid | 42.4 | 5.1 wt % |
| methyl methacrylate | 168 | 20.3 wt % |
| styrene | 384 | 46.3 wt % |
| 2-ethylhexyl acrylate | 160 | 19.3 wt % |
| IGEPAL CO-630 | 4 | |
| First Initiator Solution | | |
| water | 30 | |
| ammonium persulfate | 3.5 | |
| Second Monomer Emulsion | | |
| water | 40 | |
| RHODACAL AL246/L | 3 | |
| butyl acrylate | 18.6 | 8.5 wt % |
| methacrylic acid | 21.6 | 9.9 wt % |
| methyl methacrylate | 42 | 19.2 wt % |
| styrene | 96 | 44.0 wt % |
| 2-ethylhexyl acrylate | 40 | 18.3 wt % |
| IGEPAL CO-630 | 1 | |
| Second Initiator Solution | | |
| water | 40 | |
| ammonium persulfate | 3.5 | |
| water (rinse) | 30 | |
| Chaser Solutions | | |
| t-butyl hydroperoxide | 1.4 | |
| water | 10 | |
| RHODACAL AL246/L | 0.3 | |
| sodium hydroxymethanesulfinate | 1 | |
| water | 15 | |

TABLE 2-continued

| Ingredients | Amount (grams) | Monomer % per stage |
|---|---|---|
| Stabilizer Solution | | |
| ammonium hydroxide (28-30%) | 15 | |
| water | 10 | |

Comparative Example A

Latex Containing One-Stage Acrylic Particles

Comparative Example A describes a one-stage acrylic latex with polymer particles having about 5% acid content and about 95% diluent monomers, about 48.5% of which are alkyl acrylate-based and about 46.5% of which are styrenic. The latex composition, in order of addition, is described below in Table 3. The latex composition of Comparative Example A is comparable to the first phase compositions of Examples 1 and 2.

TABLE 3

| Ingredients | Amount (grams) | Monomer % |
|---|---|---|
| Initial kettle charge | | |
| water | 39.5 | |
| RHODACAL AL246/L | 0.1 | |
| Monomer Emulsion | | |
| water | 8.5 | |
| RHODACAL AL246/L | 1.4 | |
| butyl acrylate | 3.9 | 8.9 wt % |
| methacrylic acid | 2.2 | 5.0 wt % |
| methyl methacrylate | 8.9 | 20.3 wt % |
| styrene | 20.4 | 46.5 wt % |
| 2-ethylhexyl acrylate | 8.5 | 19.4 wt % |
| RHODAPEX CO-436 | 0.2 | |
| ammonium hydroxide (28-30%) | 0.1 | |
| First Initiator Solution | | |
| water | 1.3 | |
| ammonium persulfate | 0.1 | |
| Second Initiator Solution | | |
| water | 1.7 | |
| ammonium persulfate | 0.1 | |
| water (rinse) | 30 | |
| Chaser Solutions | | |
| t-butyl hydroperoxide | 0.1 | |
| water | 0.4 | |
| sodium hydroxymethanesulfinate | <0.1 | |
| water | 0.6 | |
| Stabilizer Solution | | |
| ammonium hydroxide (28-30%) | 0.5 | |
| water | 0.4 | |

Example 3 and Comparative Example B

Paint Compositions Containing a Stage-Polymerized Latex According to the Invention and a One-Stage Latex Example 3 describes a paint composition comprising the latex of Example 1, and Comparative Example B describes a paint composition comprising the latex of Comparative Example A. The paint compositions, in order of addition, are described below in Table 4.

TABLE 4

| Ingredients | Example 3 Amount (grams) | Comparative Ex. B Amount (grams) |
|---|---|---|
| Grind Composition | | |
| propylene glycol | 17.5 | 17.5 |
| water | 41.7 | 41.7 |
| TAMOL 165A | 11.2 | 11.2 |
| ammonium hydroxide (28-30%) | 1.3 | 1.3 |
| TRITON CF-10 | 1.9 | 1.9 |
| TEGO FOAMEX 1488 | 0.6 | 0.6 |
| TRONOX CR-826 | 260 | 260 |
| Other pigment(s)/colorant(s), if desired | | |
| NUOSEPT 95 | 1 | 1 |
| water | 19.7 | 19.7 |
| Acrylic Stage Latex (Ex. 1) | 634 | — |
| Acrylic One-Stage Latex (Comp. Ex. A) | — | 634 |
| pH Adjuster | | |
| ammonia (26% in water) | 3.9 | 3.9 |
| Performance Additive Composition | | |
| EASTMAN EEH solvent | 21.3 | 21.3 |
| TRITON X-100 | 4.9 | 4.9 |
| DREWPLUS L-493 | 3.9 | 3.9 |
| BYK-019 | 1.6 | 1.6 |
| Anticorrosive Solution | | |
| sodium nitrite | 2.2 | 2.2 |
| water | 12.5 | 12.5 |
| pH Adjuster | | |
| ammonia (26% in water) | 1 | 1 |
| Rheology Modifier | | |
| water | 4.2 | 4.2 |
| ACRYSOL RM-2020 NPR | 15 | 15 |
| ACRYSOL RM-825 | 1.5 | 1.5 |
| Other colorant(s), if desired | | |

Both the paint compositions of Example 3 and Comparative Example B had a measured viscosity of about 100 KU immediately after formulation. The paint compositions of Example 3 and Comparative Example B were then each hand-mixed using a spatula for a few minutes with Acrylic Epoxy Coating Catalyst M4484, commercially available from Benjamin Moore. Once mixed with the epoxy and catalyst, these acrylic-epoxy mixtures were allowed to stand for about 30 minutes, after which test panels were prepared. 3 mil (0.003") draw-down test panels were prepared on steel panels for water resistance and corrosion resistance testing. The panels were air dried at ambient conditions (about 20-25° C.) for approximately seven days.

Water resistance tests were performed using controlled condensation conditions according to ASTM D4585-99. Salt spray (fog) tests were also performed according to ASTM B117-90. In addition, the panels were evaluated for blistering using ASTM D714-97. The areas of blistering were rated as few, medium, medium dense, and dense, with few indicating the smallest area of blistering. The blistering size was rated at 10 to 0, where 10 represented no blistering, 8 represented the smallest size of blistering, and 2 represented the largest size of blistering. Further, the degree of corrosion (rusting) of the steel panels was evaluated according ASTM D610-95, with numerical ratings from 10 to 0, with 10 representing the minimum amount of rust and 0 representing the maximum amount of rust. The comparison of performance of Example 3 and Comparative Example B can be seen in Tables 5 and 6 below.

TABLE 5

Water Resistance Tests Using Controlled Condensation.

| Epoxy mix w/ | Exposure Time | Blistering Size | Blistering Area | Degree of Corrosion |
|---|---|---|---|---|
| Ex. 3 | 3 days | 10 | Few | 10 |
| Comp. Ex. B | 3 days | 6 | Medium | 5 |
| Ex. 3 | 1 week | 8 | Medium | 8 |
| Comp. Ex. B | 1 week | 6 | Medium Dense | 2 |

TABLE 6

Salt Spray (Fog) Test

| Epoxy mix w/ | Exposure Time | Blistering Size | Blistering Area | Degree of Corrosion |
|---|---|---|---|---|
| Ex. 3 | 48 hours | 8 | Few | 8 |
| Comp Ex. B | 48 hours | 8 | Medium | 3 |

As can be seen from the results above, the sequentially polymerized paint composition of Example 3, when reacted with epoxy, exhibited improved water and corrosion resistance, as compared to epoxy reacted with the one-stage paint composition of Comparative Example B.

Examples 4-9

Sequentially Polymerized Latexes and Paint Compositions According to the Invention Example 4 describes an expected acrylic sequentially polymerized latex with polymer particles having a first phase with about 4% acid content and about 96% diluent monomers, about 49% of which are alkyl acrylate-based and about 47% of which are styrenic, and a second phase with about 14.5% acid content and about 86.5% diluent monomer, about 44.8% of which are alkyl acrylate-based and about 41.8% of which are styrenic. The first phase is about 80% of the particle, and the second phase is about 20% of the particle.

Example 5 describes an expected acrylic sequentially polymerized latex with polymer particles having a first phase with about 3% acid content and about 97% diluent monomers, about 50% of which are alkyl acrylate-based and about 47% of which are styrenic, and a second phase with about 13% acid content and about 87% diluent monomer, about 44.5% of which are alkyl acrylate-based and about 42.5% of which are styrenic. The first phase is about 70% of the particle, and the second phase is about 30% of the particle.

Example 6 describes an expected acrylic sequentially polymerized latex with polymer particles having a first phase with about 3.5% acid content and about 96.5% diluent monomers, about 49.4% of which are alkyl acrylate-based and about 47.1% of which are styrenic, and a second phase with about 13.5% acid content and about 86.5% diluent monomer, about 44.2% of which are alkyl acrylate-based and about 42.2% of which are styrenic. The first phase is about 75% of the particle, and the second phase is about 25% of the particle.

The latex compositions of Examples 4-6, in order of addition, are described below in Table 7.

TABLE 7

| Ingredients | Example 4 Amount [g] | Example 5 Amount [g] | Example 6 Amount [g] |
|---|---|---|---|
| *Initial kettle charge* | | | |
| water | 880 | 880 | 880 |
| RHODAPON UB | 2.5 | 2.5 | 2.5 |
| *First Monomer Emulsion* | | | |
| water | 160 | 160 | 160 |
| RHODAPON UB | 28 | 28 | 28 |
| butyl acrylate | 74.4 (9.1 wt %) | 65.1 (9.2 wt %) | 69.8 (9.1 wt %) |
| methacrylic acid | 32.8 (4.0 wt %) | 21.3 (3.0 wt %) | 26.7 (3.5 wt %) |
| methyl methacrylate | 168 (20.5 wt %) | 147 (20.7 wt %) | 157.5 (20.6 wt %) |
| styrene | 384 (46.9 wt %) | 336 (47.4 wt %) | 360 (47.1 wt %) |
| 2-ethylhexyl acrylate | 160 (19.5 wt %) | 140 (19.7 wt %) | 150 (19.6 wt %) |
| IGEPAL CO-630 | 3.2 | 3.2 | 3.2 |
| *First Initiator Solution* | | | |
| water | 30 | 30 | 30 |
| ammonium persulfate | 5 | 5 | 5 |
| *Second Monomer Emulsion* | | | |
| water | 40 | 40 | 40 |
| RHODAPON UB | 7 | 7 | 7 |
| butyl acrylate | 18.6 (8.1 wt %) | 27.9 (8.2 wt %) | 23.3 (8.2 wt %) |
| methacrylic acid | 33.3 (14.5 wt %) | 44.1 (13.0 wt %) | 38.8 (13.6 wt %) |
| methyl methacrylate | 42 (18.3 wt %) | 63 (18.6 wt %) | 52.5 (18.4 wt %) |
| styrene | 96 (41.8 wt %) | 144 (42.5 wt %) | 120 (42.2 wt %) |
| 2-ethylhexyl acrylate | 40 (17.4 wt %) | 60 (17.7 wt %) | 50 (17.6 wt %) |
| IGEPAL CO-630 | 0.8 | 0.8 | 0.8 |
| *Second Initiator Solution* | | | |
| water | 40 | 40 | 40 |
| ammonium persulfate | 2 | 2 | 2 |
| water (rinse) | 30 | 30 | 30 |
| *Chaser Solutions* | | | |
| t-butyl hydroperoxide | 1.4 | 1.4 | 1.4 |
| water | 10 | 10 | 10 |
| RHODAPON UB | 0.3 | 0.3 | 0.3 |
| sodium hydroxymethanesulfinate | 1 | 1 | 1 |
| water | 15 | 15 | 15 |
| *Stabilizer Solution* | | | |
| ammonium hydroxide (28-30%) | 10 | 10 | 10 |
| water | 10 | 10 | 10 |

Examples 7-9 describe paint compositions comprising the latexes of Examples 4-6, respectively. The expected paint compositions of Examples 7-9 can be obtained by using Example 3 as a guide and by substituting the expected latexes of Examples 4-6, respectively, for the latex of Example 1.

Example 10

Comparison of Incubation Stability of Sequentially Polymerized Latex Paint Compositions to One-Stage Latex Paint Compositions Example 10a describes a paint composition comprising a one-stage acrylic latex with polymer particles having about 8% acid content and about 92% diluent monomers, about 47.7% of which are alkyl acrylate-based and about 44.1% of which are styrenic. Example 10b describes a paint composition comprising a one-stage acrylic latex with polymer particles having about 10% acid content and about 90% diluent monomers, about 45.7% of which are alkyl acrylate-based and about 44.1% of which are styrenic. The latex compositions of Examples 10a and 10b, in order of addition, are described below in Table 8.

TABLE 8

| Ingredients | Example 10a Amount [g] | Example 10b Amount [g] |
|---|---|---|
| *Initial kettle charge* | | |
| water | 830 | 880 |
| RHODAPON UB | 2.5 | 2.5 |
| *First Monomer Emulsion* | | |
| water | 200 | 220 |
| RHODAPON UB | 35 | 35 |
| butyl acrylate | 93 (8.9 wt %) | 90 (8.6 wt %) |
| methacrylic acid | 86 (8.2 wt %) | 106 (10.2 wt %) |
| methyl methacrylate | 205 (19.6 wt %) | 178 (17 wt %) |
| styrene | 460 (44.1 wt %) | 460 (44.1 wt %) |
| 2-ethylhexyl acrylate | 200 (19.2 wt %) | 210 (20.1 wt %) |
| RHODAPEX CO-436 | — | 4 |
| IGEPAL CO-630 | 4 | — |
| *First Initiator Solution* | | |
| water | 30 | 30 |
| ammonium persulfate | 5 | 5 |

TABLE 8-continued

| Ingredients | Example 10a Amount [g] | Example 10b Amount [g] |
|---|---|---|
| Second Initiator Solution | | |
| water | 40 | 40 |
| ammonium persulfate | 2 | 2 |
| water (rinse) | 10 | 20 |
| Chaser Solution | | |
| t-butyl hydroperoxide | 1.4 | 1.4 |
| water | 10 | 10 |
| RHODAPON UB | 0.3 | 0.3 |
| sodium hydroxymethanesulfinate | 1 | 1 |
| water | 15 | 15 |
| Stabilizer Solution | | |
| ammonium hydroxide (28-30%) | 25 | 17 |
| water | 80 | — |

The paint compositions of Examples 10a and 10b, in order of addition, are described below in Table 9. The grind compositions in each of these Examples are ground at about 2000 rpm for about 10 minutes before each latex is added.

TABLE 9

| Ingredients | Example 10a Amount (grams) | Example 10b Amount (grams) |
|---|---|---|
| Grind Composition | | |
| methyl carbitol | 13 | 13 |
| water | 20 | 20 |
| TAMOL 165A | 11.5 | 11.5 |
| TRITON QS-44 | 6 | — |
| ammonium hydroxide (28-30%) | 1.6 | 1.3 |
| TRITON CF-10 | 2 | 2 |
| TEGO FOAMEX 1488 | — | 0.4 |
| Pigment(s)/Colorant(s), if desired | | |
| NUOSEPT 95 | 1 | 1 |
| ammonium hydroxide (28-30%) | 0.1 | — |
| Acrylic One-Stage Latex (from Table 8) | 722 | 722 |
| Performance Additive Composition | | |
| EASTMAN EEH solvent | 24 | 24 |
| TRITON X-100 | 2.5 | 2.5 |
| SURFYNOL DF-58 | — | 4.5 |
| BYK-024 | 6.2 | — |
| Anticorrosive Solution | | |
| sodium nitrite (15% in water) | 10 | 10 |
| Rheology Modifier | | |
| water | 30 | 30 |
| ACRYSOL RM-2020 NPR | 22 | 13 |
| pH Adjuster | | |
| ammonium hydroxide (28-30%) | 6.2 | 6.2 |
| Other colorant(s), if desired | | |

The paint compositions of Examples 10a and 10b had measured viscosities of about 82 and 84 KU, respectively, immediately after formulation. The paint compositions of Examples 10a and 10b were then each placed in an oven at a temperature of about 120° F. After about 8 days, the paint composition of Example 10a gelled (viscosity>130 KU). After about 3 days, the paint composition of Example 10b was extremely thick (viscosity>120 KU).

Examples 10c and 10d both describe paint compositions comprising acrylic sequentially polymerized latexes with polymer particles having a first phase with about 5% acid content and about 95% diluent monomers, about 48.7% of which are alkyl acrylate-based and about 46.3% of which are styrenic, and a second phase with about 10% acid content and about 90% diluent monomer, about 46% of which are alkyl acrylate-based and about 44% of which are styrenic. For both of these compositions, the first phase is about 80% of the particle, and the second phase is about 20% of the particle. The latex compositions of both Examples 10c and 10d are identical to that of Example 2. The paint compositions of Examples 10c and 10d, in order of addition, are described below in Table 10. The grind compositions in each of these Examples are ground at about 2000 rpm for about 10 minutes before each latex is added.

TABLE 10

| Ingredients | Example 10c Amount (grams) | Example 10d Amount (grams) |
|---|---|---|
| Grind Composition | | |
| methyl carbitol | 7.5 | 6.5 |
| water | 10 | 10 |
| TAMOL 165A | 6.8 | 5.8 |
| TRITON QS-44 | 3 | — |
| ammonium hydroxide (28-30%) | 0.8 | 0.7 |
| TRITON CF-10 | 1 | 1 |
| TEGO FOAMEX 1488 | 0.2 | 0.2 |
| NUOSEPT 95 | 0.5 | 0.5 |
| ammonium hydroxide (28-30%) | 0.06 | — |
| Acrylic Stage Latex (Ex. 2) | 361 | 361 |
| Performance Additive Composition | | |
| EASTMAN EEH solvent | 12 | 12 |
| TRITON X-100 | 1.3 | 1.3 |
| BYK-024 | — | 3.1 |
| SURFYNOL DF-58 | 2.3 | — |
| Anticorrosive Solution | | |
| sodium nitrite (15% in water) | 4.9 | 4.3 |
| Rheology Modifier | | |
| water | 15 | 15 |
| ACRYSOL RM-2020 NPR | 15 | 6.3 |
| pH Adjuster | | |
| ammonia (26% in water) | 2.8 | — |
| Other colorant(s), if desired | | |

The paint compositions of Examples 10c and 10d had measured viscosities of about 80 and 89 KU, respectively, immediately after formulation. The paint compositions of Examples 10c and 10d were then each placed in an oven at a temperature of about 120° F. After about 7 days, the paint compositions of Examples 10c and 10d were relatively stable, having viscosity increases of about 3 KU and about 7 KU, respectively, but in any event not more than about 10 KU over that period.

While various embodiments of the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

The invention claimed is:

1. An acrylic latex comprising sequentially polymerized polymer particles formed in at least two polymerization stages so as to form a first phase, which results from a first polymerization stage, and a second phase, which results from a second polymerization stage, wherein:
   water, a surfactant, a first set of monomers that form the first phase and that comprise at least one polymerizable epoxy-reactive monomer and at least one polymerizable diluent monomer, a second set of monomers that form the second phase and that comprise at least one polymerizable epoxy-reactive monomer and at least one polymerizable diluent monomer, an initiator, optionally an organic solvent, optionally a pH adjustor, optionally a chaser solution, and optionally a preservative are combined under conditions sufficient to form the sequentially polymerized polymer particles;
   the first set of monomers has a first acid content, the second set of monomers has a second acid content, and the first acid content is lower than the second acid content;
   both the first set of monomers and the second set of monomers are substantially free from hydroxyl-functional epoxy-reactive monomers;
   both the first set of monomers and the second set of monomers are substantially free from crosslinking monomers;
   the glass transition temperatures of the first phase polymer formed by the first set of monomers and of the second phase polymer formed by the second set of monomers are both above 30° C. and less than about 80° C.;
   the sequentially polymerized polymer particles of the acrylic latex are substantially free from pre-polymerized polymer particles that were not formed during any of the at least two polymerization stages;
   wherein the second set of monomers comprises an acid monomer content from 6% to about 20% by weight and one or more diluent monomers, and wherein the second set of monomers also comprises an acid monomer content from 2% to about 15% by weight more than the acid monomer content of the first set of monomers; and
   wherein the latex is suitable for aqueous paint compositions.

2. The acrylic latex of claim 1, wherein the first set of monomers comprises a non-zero alkacrylic acid content of up to about 10% by weight and one or more diluent monomers.

3. The acrylic latex of claim 2, wherein the initiator comprises water and ammonium persulfate.

4. The acrylic latex of claim 1, wherein the second set of monomers comprises alkacrylic acid.

5. The acrylic latex of claim 4, wherein the second set of monomers further comprises a second initiator comprising water and ammonium persulfate.

6. The acrylic latex of claim 1, wherein the first set of monomers comprises from about 3% to about 6% by weight of methaurylic acid, and diluent monomers selected from the group consisting of butyl acrylate, methyl methacrylate, 2-ethylhexyl acrylate, styrene, and combinations thereon wherein the second set of monomers comprises from about 8% to about 15% by weight of methacrylic acid, and diluent monomers selected from the group consisting of butyl acrylate, methyl methacrylate, 2-ethylhexyl acrylate, styrene, and combinations thereof, and wherein both the first and the second initiator solutions comprise water and ammonium persulfate.

7. An acrylic-based latex paint composition comprising the acrylic latex comprising sequentially polymerized polymer particles according to claim 1, water, a coalescence solvent, optionally a pH adjustor, a surfactant, a defoamer, a pigment, optionally a dispersant, optionally an anticorrosive agent, optionally a rheology modifier, and optionally a preservative.

8. The paint composition of claim 7, wherein at least one of the following is satisfied:
   the coalescence solvent comprises 2-ethylbexyl ether of ethylene glycol, methyl carbitol, propylene glycol, ethylene glycol, or a combination thereof;
   the pH adjustor is present and comprises ammonium hydroxide, ammonia, or a combination thereof;
   the anticorrosive agent is present and comprises sodium nitrite;
   the surfactant comprises nonoxynol-4 sulfate, nonylphenol ethoxylate(10), octylphenol ethoxylate(9-10), sodium dodecyl sulfonate, sodium tetradecyl sulfonate, sodium hexadecyl sulfonate, a phosphate-esterified polyether, an ethoxylated amine, or a combination thereof;
   the defoamer comprises a polysiloxane, a polyether, or a copolymer thereof
   the pigment comprises a titanium oxide;
   the optional dispersant is present and comprises 2-amino-2-methyl-1-propanol, a hydrophobically modified polyacid, an ammonia-neutralized polyacid, or a combination or copolymer thereof;
   the optional rheology modifier is present and comprises a hydrophobically modified urethane; and
   the optional preservative is present and comprises 5-hydroxymethyl-1-aza-3,7-dioxabicyclo(3.3.0)octane, 5-hydroxymethoxymethyl-1-aza-3,7-dioxabicyclo (3.3.0) octane, 5-hydroxypoly[methyleneoxy(74% $C_2$, 21% $C_3$, 4% $C_4$, 1% $C_5$)methyl-1-aza-3,7-dioxabicyclo (3.3.0)octane], or a combination thereof.

9. A two-pack acrylic-epoxy paint comprising
   (A) a first component comprising an acrylic latex comprising sequentially polymerized particles comprising a first phase and a second phase,
   wherein the first phase is fonned from a first set of monomers comprising at least one polymerizable epoxy-reactive monomer and at least one polymerizable diluent monomer, and wherein the second phase is formed from a second set of monomers comprising at least one polymerizable epoxy-reactive monomer and at least one polymerizable diluent monomer;
   wherein the first set of monomers has a first acid content, the second set of monomers has a second acid content, and the first acid content is lower than the second acid content;
   wherein both the first set of monomers and the second set of monomers are substantially free from hydroxyl-functional epoxy-reactive monomers;
   wherein the glass transition temperatures of the first phase polymer formed by the first set of monomers and of the second phase polymer formed by the second set of monomers are both above about 20° C.; and
   wherein the second set of monomers comprises an acid monomer content from 6% to about 20% by weight and one or more diluent monomers, and wherein the second set of monomers also comprises an acid monomer content from 2% to about 15% by weight more than the acid monomer content of the first set of monomers; and
   (B) a second component comprising an epoxy composition that comprises an epoxy-functional compound.

10. The two-pack acrylic-epoxy paint of claim 9, wherein the epoxy-functional compound comprises an alkyl glycidyl ether, an alkylene glycol diglycidyl ether, an allyl glycidyl ether, diglycidyl ether of bisphenol A or a self-reaction product thereof, neopentyl glycol diglycidyl ether, a novolac glycidyl ether, an alkyl glycidyl ester, a fatty acid glycidyl ester, phenyl glycidyl ester, phthalic acid diglycidyl ester, poly (acrylic acid glycidyl ester) or a copolymer thereof with one or more other acrylic monomers, a poly(alkacrylic acid glycidyl ester) or a copolymer thereof with one or more other acrylic monomers, or a combination or copolymer thereof.

11. A method for forming sequentially polymerized polymer particles in a latex comprising the steps of:
provautomaticallyiding an aqueous monomer emulsion in a reaction vessel;
adding a first initiator solution to the aqueous monomer emulsion in the reaction vessel;
adding a first set of monomers having a first acid content to the reaction vessel;
sequentially following the adding of the first set of monomers, optionally co-adding an intervening set of monomers and an intervening initiator solution to the reaction vessel;
sequentially following the adding of the intervening set of monomers, co-adding a second set of monomers having a second acid content and a second initiator solution to the reaction vessel;
sequentially polymerizing the first set of monomers to form a first phase of each of the polymer particles and the second set of monomers to form a second phase of each of the polymer particles, with the optional intervening set of monomers being polymerized therebetween, to form a sequentially polymerized emulsion;
optionally adding water to rinse the sequentially polymerized emulsion;
optionally adding a chaser solution to the sequentially polymerized emulsion; and
optionally adding an additive solution to help stabilize the sequentially polymerized emulsion,
wherein the sequential adding steps for the second set of monomers and for the optional intervening set of monomers are performed either (a) immediately after the step of adding the first set of monomers, the optional intervening set of monomers, or both, or (b) after a period of time has elapsed, but without manipulating, isolating, purifying, or separating any polymerized particle from the first phase,
wherein the sequentially polymerized polymer particles of the latex are substantially free from pre-polymerized polymer particles that were not formed during the steps of adding any of the sets of monomers,
wherein the first acid content of the first set of monomers is lower than the second acid content of the second set of monomers,
wherein the glass transition temperatures of the first phase polymer formed by the first set of monomers and of the second phase polymer formed by the second set of monomers are both above 30° C. and less than about 80° C.,
wherein both the first set of monomers and the second set of monomers are substantially free from crosslinking monomers,
wherein the second set of monomers comprises an acid monomer content from 6% to about 20% by weight and one or more diluent monomers, and wherein the second set of monomers also comprises an acid monomer content from 2% to about 15% by weight more than the acid monomer content of the first set of monomers, and
wherein the latex is suitable for aqueous paint compositions.

12. The method of claim 11, wherein there is no optional intervening set of monomers and no optional intervening initiator solution, such that the sequentially polymerized polymer particles are formed in two stages.

13. The method of claim 12, wherein the first set of monomers comprises a non-zero alkacrylic acid content of up to about 10% by weight and one or more diluent monomers.

14. The method of claim 13, wherein the first initiator solution comprises water and anmonium persulfate.

15. The method of claim 12, wherein the second set of monomers comprises alkacrylic acid.

16. The method of claim 15, wherein the second initiator solution comprises water and ammonium persulfate.

17. The method of claim 12, wherein the first set of monomers comprises from about 3% to about 6% by weight of methacrylic acid, and diluent monomers selected from the group consisting of butyl acrylate, methyl methacrylate, 2-ethyihexyl acrylate, styrene, and combinations thereof, wherein the second set of monomers comprises from about 8% to about 15% by weight of methacrylic acid, and diluent monomers selected from the group consisting of butyl acrylate, methyl methacrylate, 2-ethyihexyl acrylate, styrene, and combinations thereof and wherein both the first and the second initiator solutions comprise water and ammonium persulfate.

18. An acrylic latex comprising sequentially polymerized polymer particles made according to the method of claim 17.

19. A method for forming an acrylic-epoxy paint comprising the steps of:
(A) formulating a paint base composition comprising the steps of:
(i) forming sequentially polymerized latex particles comprising the steps of:
(a) providing an aqueous monomer emulsion in a reaction vessel;
(b) adding a first initiator solution to the aqueous monomer emulsion in the reaction vessel;
(c) adding a first set of monomers having a first acid content to the reaction vessel;
(d) sequentially following the adding of the first set of monomers, optionally co-adding an intervening set of monomers and an intervening initiator solution to the reaction vessel;
(e) sequentially following the adding of the intervening set of monomers, co-adding a second set of monomers having a second acid content and a second initiator solution to the reaction vessel;
(f) sequentially polymerizing the first set of monomers to form a first phase of each of the polymer particles and the second set of monomers to form a second phase of each of the polymer particles, with the optional intervening set of monomers being polymerized therebetween, to form a sequentially polymerized emulsion;
wherein the first acid content of the first set of monomers is lower than the second acid content of the second set of monomers,
wherein the glass transition temperatures of the first phase polymer formed by the first set of monomers and of the second phase polymer formed by the second set of monomers are both above about 20° C., and
wherein the second set of monomers comprises an acid monomer content from 6% to about 20% by weight and one or more diluent monomers, and wherein the second set of monomers also comprises an acid monomer content from 2% to about 15% by weight more than the acid monomer content of the first set of monomers, and (ii) adding the sequentially polymerized emulsion to a composition comprising water, a coalescence solvent, a surfactant, a defoamer, a pigment;

(B) mixing the acrylic-based latex paint composition with an epoxy composition comprising an epoxy-functional compound and optionally a catalyst.

20. The acrylic latex of claim 1, wherein the difference between the glass transition temperature of the first phase polymer and the second phase polymer is less than about 10° C.

21. The two-pack acrylic-epoxy paint of claim 9, wherein the first set of monomers comprises a non-zero alkacrylic acid content of up to about 10% by weight and one or more diluent monomers.

22. The two-pack acrylic-epoxy paint of claim 21, wherein the initiator comprises water and ammonium persulfate.

23. The two-pack acrylic-epoxy paint of claim 9, wherein the second set of monomers comprises alkacrylic acid.

24. The two-pack acrylic-epoxy paint of claim 23, wherein the second set of monomers further comprises a second initiator comprising water and ammonium persulfate.

25. The two-pack acrylic-epoxy paint of claim 9, wherein both the first set of monomers and the second set of monomers are substantially free from crosslinking monomers.

26. The method of claim 11, wherein the step of adding the first set of monomers further comprises adding the second initiator solution.

27. The method of claim 11, wherein the first initiator solution and the second initiator solution are the same.

28. The method of claim 19, wherein both the first set of monomers and the second set of monomers are substantially free from crosslinking monomers.

29. The method of claim 19, wherein the step of adding the first set of monomers further comprises adding the second initiator solution.

* * * * *